Figure 1:
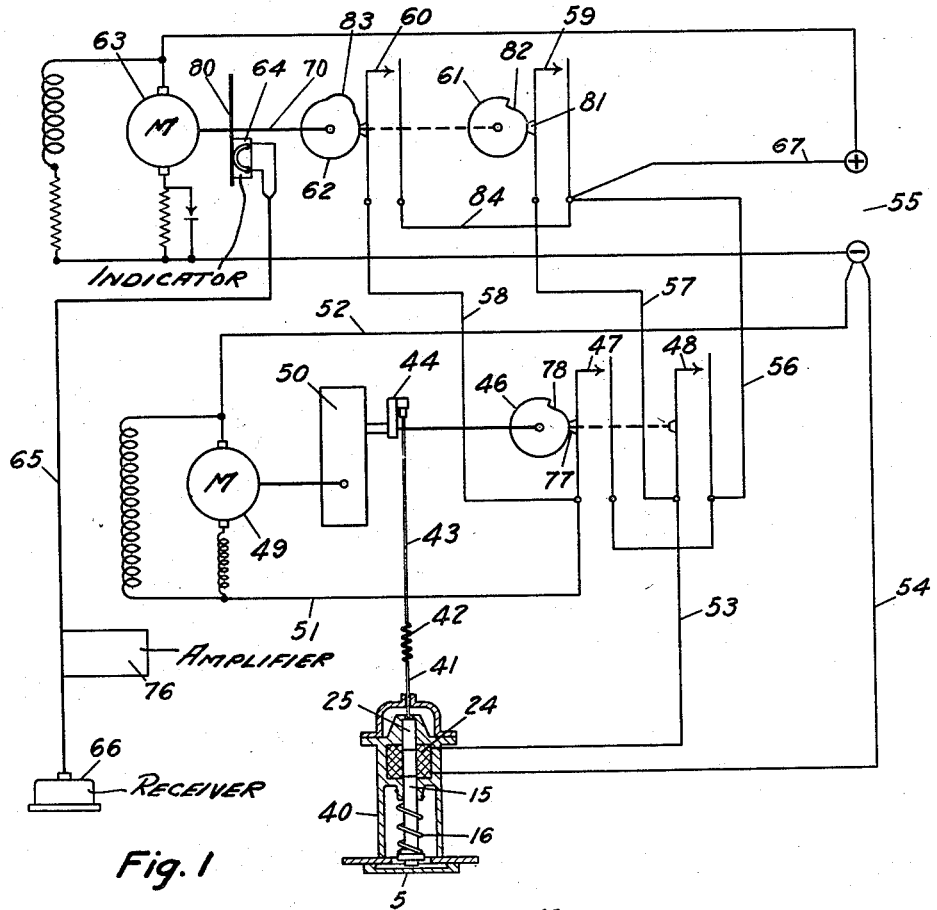

May 11, 1937. H. W. HOLLIS 2,079,612
DEPTH MEASUREMENT
Filed July 30, 1931 2 Sheets-Sheet 1

INVENTOR
Howard W. Hollis
BY
ATTORNEY

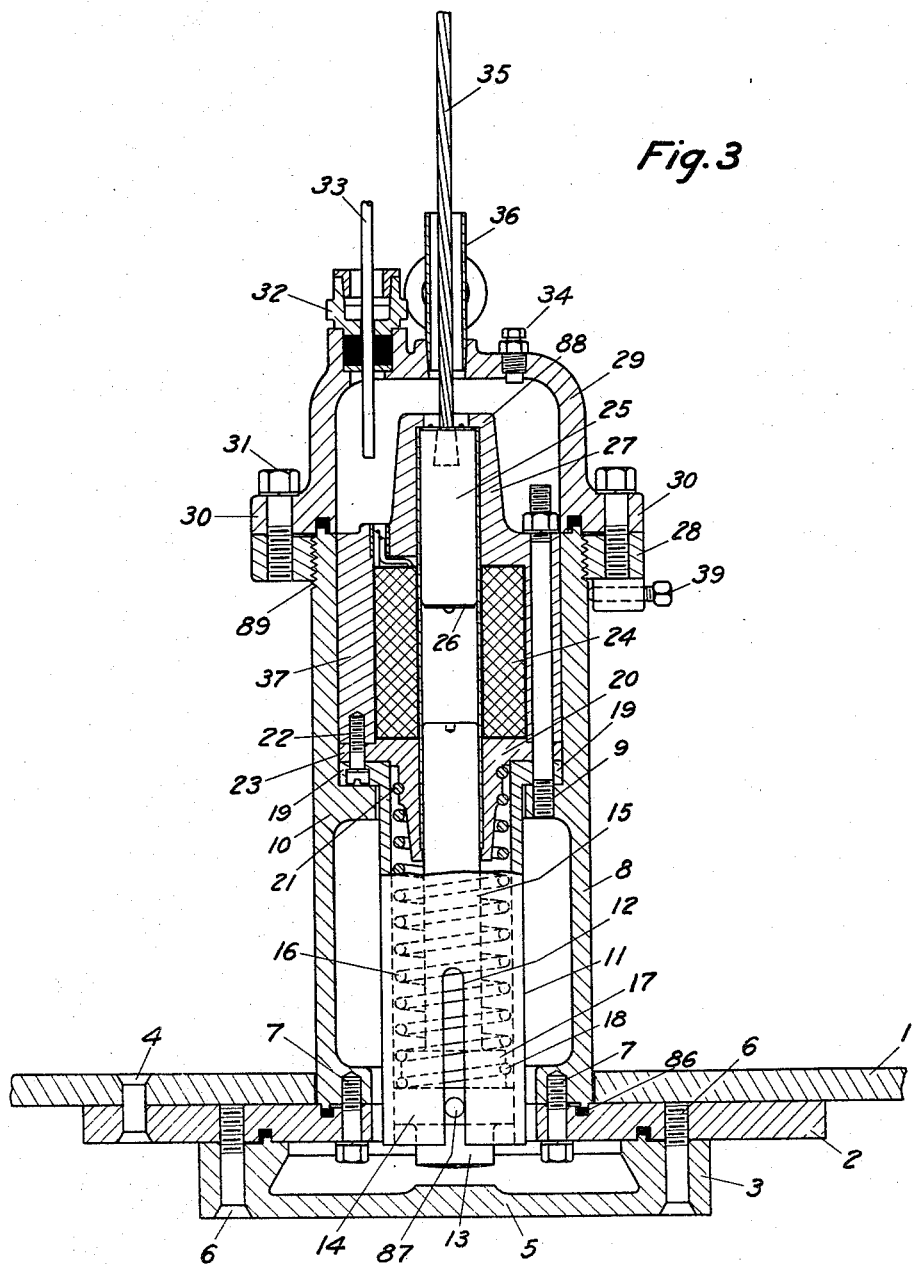

Patented May 11, 1937

2,079,612

UNITED STATES PATENT OFFICE 2,079,612

DEPTH MEASUREMENT

Howard Windsor Hollis, Quincy, Mass., assignor to Submarine Signal Company, Boston, Mass., a corporation of Maine Application July 30, 1931, Serial No. 553,964

10 Claims. (Cl. 177—386)

The present invention relates to a depth sounding system which may be used for any depth or distance measurement but is more particularly adapted to the measurement of depths beneath a vessel.

Devices of the prior art of this nature, which are operated electrically or in which the sound waves used as an element for measuring the distance has been produced electrically, have usually been operated directly from the ship's supply or from generators operated by the ship's supply. In such systems it has been common practice to use as a sound source an impact oscillator or impact striker which is directly operated on the ship's mains. In such methods of producing the sound in depth measuring systems, the moment of the production of the sound is usually synchronized with a zero position of the indicator. This synchronization is controlled in various ways, the most common perhaps being by a series of contacts or switches operated successively for releasing the striking mechanism in the impact oscillator which has previously been withdrawn against the action of the spring. Usually in such systems after the striking element has been energized to an operating position, the electric current in the solenoid for pulling the striker is cut down to just a sufficient value for holding the striker until such time when the indicator has reached the zero position, when the current is entirely broken and the striker released.

It will be appreciated that various corrections must be made not only for the draft of the vessel which, of course, is independent of the operation of the striking mechanism, but also for the time it takes the striker to travel from its released position to the diaphragm and the lag in the electrical circuit for releasing the striking element. Such corrections are definitely provided for in the present systems and cause very little trouble, although in the earlier devices much difficulty has been experienced in determining the exact moment when the sound signal was produced.

The present invention is a modification of the general system described above and is particularly adapted to vessels where the pressure or voltage available for operation of the depth sounding apparatus is low. It is quite common practice in smaller types of vessels, particularly in vessels of the trawler type and in small wooden vessels, to use for the electrical ship's supply a set of storage batteries which may or may not be operated by a small charging generator. In systems having low voltages, as, for instance, of the magnitude of 32 volts, it is quite difficult to provide an impact striker which will generate a sufficiently powerful sound vibration to enable the measurement of the deep depths which some of the small boats require in their work. This is particularly true of fishing trawlers where it is often desired to provide apparatus which will automatically measure depths as deep as 400 fathoms. In such cases it is extremely desirable to provide an intense source of power, but with the voltage available on board the ship this would practically be impossible or demand at least an impact striker or oscillator of a very large and bulky size.

In order to obtain a powerful oscillator of the impact type, not only would the solenoid in the impact oscillator be very large, but so much current would be drawn from the system that it might seriously interfere with other devices run by the batteries or run the batteries down very quickly.

In the present invention the impact oscillator is energized mechanically by a crank operated through a reduction gear by an electric motor supplied from the ship's mains. The motor is of the type suited for a low voltage source, and is of such a horse power that not much current will be drawn from the system during its operation. By means of the reduction gear the impact oscillator is slowly energized to the point where it is in position for operation.

A feature of this system is that the oscillator can not operate to produce a sound until the indicating system is perfectly synchronized with it. This feature is partially obtained by means of a series of switches and cams, some operating on the motor driving the indicator and others on the motor energizing the impact oscillator and is further obtained by means of a yielding coupling on the lifting element of the impact oscillator itself.

Figure 2:
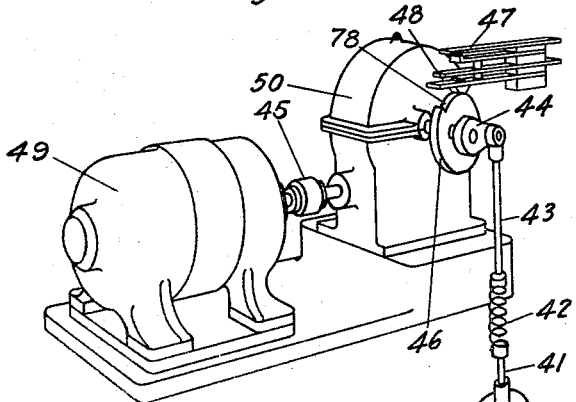

The invention will be more fully understood with reference to the drawings, showing the embodiment of the same in which Fig. 1 shows schematically the transmitting system and the method of synchronization with the indicator; Fig. 2 shows in perspective the operation of the impact striker and the control cams for controlling the motor and the release of the striking mechanism; and Fig. 3 shows a section through the impact oscillator or striker.

In Fig. 1 which shows the schematic arrangement of the entire system the sound is produced by the impact striker 40 through the vibration of the diaphragm 5 and is received by the receiver 66 which operates the indicator 64 over the line 65. An amplifier 76 of the type described in the patent of Edwin E. Turner, Jr., No. 2,033,160 of March 10, 1936, might be used. The impact oscillator or striker 40 is electrically controlled by means of the electromagnet 24 and the solenoid core or pole 25 operating within the electromagnet or solenoid 24. The oscillator 40 is operated mechanically by means of the motor 49 operating the crank 44 through the reduction gear 50. The crank 44 serves to pull upwards the cable 43 which is joined through a spring 42 to the cable 41 and thereby operates through the pole element 25 attached to the cable 41 to energize the oscillator 40. This is accomplished by allowing the pole element 25 to move downward until contact is made with the striking element 15.

At the point when contact is made, the solenoid coil 24 having been energized by the closing of contacts 48 or 59, the pole element 25 holds fast the plunger 15, withdrawing the latter against the tension of the spring 16. The plunger 15 is raised by the motion of the crank 44 until the pole element 25 comes to the top of the oscillator casing whereupon the spring 42 becomes slightly extended as the crank 44 travels to its maximum upward position. At this point the cam 46, operating on the same shaft as the crank 44, allows the switch 47 to open as the projecting stud 77 falls into the low point 78 of the cam 46. This immediately opens the motor circuit and stops the crank at the highest position in its rotation.

The cam 46 and the switch 47 may be so set that the motor circuit will be opened just prior to the crank 44 reaching its highest position, so that the crank will not go beyond this position as the motor stops. At the same time that the switch 47 is opened, the switch 48 also opens. The switch 48 is connected in one line of the main 55 by means of the conductors 67 and 56 and controls the supply of current to the coil 24 over the line 53 and the return line 54. When the switch 48 is opened, the coil 24 would become deenergized but for the fact that in parallel with the switch 48 is a second switch 59 placed in parallel with the switch 48 by means of the conductors 56 and 57. Therefore, unless both switches 59 and 48 are opened, the coil 24 will remain energized. The switch 59 is operated by means of the cam 61 which is controlled by the motor 63.

The motor 63 drives the disk 80 on which the indicator 64 is mounted through the shaft 70. The motor 63 also operates the cams 62 and 61, controlling the opening and closing of the switches 60 and 59. When the projecting element 81 of the switch 59 comes to the low point 82 of the cam 61, the switch 59 is opened and thereupon a plunger 15 of the impact oscillator 40 is released and a sound is produced as the plunger 15 strikes the diaphragm 5.

The contact 59 is timed in connection with the indicator 64 and the scale 68 so that it will sound at the correct moment in the revolution of the indicator to give direct indications on the scale when the echo returns to the receiver 66. The cam 62 operates much more rapidly than the cam 46 and gives therefore a much closer regulation and synchronization of the moment of the production of the sound waves.

The switch 60 is connected in parallel across the switch 47 and is open at all times except when the projecting element 83 of the cam 62 momentarily closes it. The switch 60 is closed immediately after the switch 59 is opened and thereby momentarily energizes the motor 49 since it completes the circuit through the motor by means of the conductor 67, conductor 84, the conductors 58 and 51 and the return conductor 52. After the projecting element 83 passes beyond the closing position of the switch 60, the cam 46 has already moved around so that the switch 47 is closed and the motor thereby continues to turn the crank 44 and again pull up the pole element 25. The striker 15 is held by the pole element 25 as soon as the cam 46 moves, since at that instant the switch 48 is closed.

In the system described above it is practically impossible for the striker 15 to give a false impulse. This is particularly true since the striker 15 can not be released until after it has reached the highest point in the oscillator. The contacts 47 and 48, it will be noted, do not open until after the plunger 15 comes to rest. Further, even after the opening of the contact 48, an impulse will not be produced until the switch 59 opens to break the circuit to the coil 24.

By means of the system described above a synchronization of the indicator with the moment of the emission of the sound impulse is definitely and reliably established. The system further provides a very powerful impulse since the motor 49 may be of very small power and the necessary force to control the spring 16 may be obtained by having a large mechanical advantage in the reduction gear 50.

The system combines, therefore, two important features, namely, that of providing a powerful source of sound and at the same time maintaining absolute synchronism of the production of the sound with the indicator.

In Fig. 2 is shown in a perspective view somewhat diagrammatical in parts, particularly with reference to the contacts 47 and 48, the operation of the impact oscillator 40 by means of the motor 49. The motor 49 may drive the reduction gear 50 by means of the flexible joint 45, and the crank 44 and the cam 46 may be mounted on the same shaft of the low-speed end of the reduction gear.

In Fig. 3 is shown in detail a section through the impact oscillator. This impact oscillator is adapted to be installed in most any kind of a vessel, but is particularly useful in wooden ships in which the wall of the ship itself can not serve as a sounding source or as a means to transmit the sound energy to the water. In such cases the casing 8 of the impact oscillator is put through a rather small hole made in the wooden sides 1 of the ship. Exterior of the ship is placed a large plate 2 which is bolted to the casing 8 by means of the bolt 7—7. A gasket 86 may be provided in a groove between the casing 8 and the plate 2 to make a joint between the two watertight. Attached to the plate 2 is the diaphragm 5 which is integral with a heavy backwardly extending rim 3. The diaphragm 5 may be attached to the plate 2 by means of bolts 6—6 spaced around the diaphragm 5. The diaphragm 5 has an inwardly extending boss positioned opposite the striking head 13 of the striker 15. The striker 15 has a lower collar adjacent to the head 13, which collar is of such a size as to serve a guide for the striker 15 in the tube 11.

A pin 87 is placed through the collar 14 and works in the slot 12 in the tube 15, and serves further to keep the striker in the same position. A spring 16 has its lower turns 18 set in grooves in a shoulder 17 of the striker in such a manner that the spring is firmly positioned in these grooves. About half way up the casing there is an inwardly extending flange 10 in which the stud 9 is set to which the whole internal mechanism of the oscillator is attached. Resting upon the flange 10 is the shoulder 19 of the tube 11, and resting upon this is the flange 23 of the element 20, completing the lower part of the magnetic circuit of the solenoid as will be presently described. The element 20 is threaded or grooved similarly as the shoulder 17 and carries the upper turn 21 of the spring 16. The striker 15 in its normal position extends upward just beyond the lower element 20 of the magnetic circuit and a short distance into the air space of the core of the coil 24. A shell 37 having a top head 27, which also forms an upper stop 88 for the pole piece 25, completes the magnetic circuit about the coil 24. The shell 37 and the lower magnetic element 23, as well as the flange 19 of the tube, are bolted together by means of the bolt 22, as shown in Fig. 3. Within the core of the coil 24 the pole element 25 is moved up and down by means of the cable 35 anchored in it. The lower end of the pole element 25 may be provided with a cushion 26 so as to dampen the sound which may result when the striker 15 and the element 25 are attracted together when the coil 24 is energized, and to prevent the plunger 15 from sticking to the pole element 25 by providing a small gap of non-magnetic material.

The upper part of the casing 29 has a flanged element 30 by means of which through the bolts 31 a watertight joint is made with the lower half of the casing. The casing 8 may be threaded at 89 and a collar 28 screwed on it, to which collar and flange 30 may be bolted. A stuffing box 32 is provided at the top of the casing about the electrical conductor 33. While the cable 35 may have a long sleeve 36 wedged into a top hole of the casing and through the sleeve 36, the cable 35 may operate.

Having now described my invention, I claim:

1. In a depth sounding system, in combination with the skin of a vessel an impact oscillator including a diaphragm having a heavy backwardly extending rim, a plate and means for fixing said rim to said plate, a casing having a smaller diameter than said plate and extending through the skin of the vessel in a hole slightly larger than said casing, means for fixing said plate to said casing, said plate being positioned externally of the vessel, and means for attaching said plate to the skin of a ship.

2. In combination in a depth sounding system, a mechanical impact-producing means including a striking element, means positioning said element to allow a reciprocating movement, spring means adapted to be compressed in one part of the movement of the striking element and to drive the striking element in another part of the movement, energizing means for moving the striking element in that part of the stroke compressing the spring including means interlocking said energizing means with said striking means, means limiting the motion of said striking means, and a yielding connection allowing the energizing means to move after the compression of the spring has been accomplished and after said striking means has come to rest, and means controlled by the energizing means for releasing the interlocking means after the striking element has reached the end of the movement compressing the spring.

3. In combination in a depth sounding system, a mechanical impact-producing means including a striking element, means positioning said element to allow a reciprocating movement, means energizing the striking element in one part of its movement, means effecting said part of the movement having a locking means for clutching said striking element, means limiting the motion of said striking means and a yielding connection for allowing motion of the means after the striking element has come to rest, and means controlled by the energizing means for releasing the interlocking means after the striking element has come to rest.

4. In combination in a depth sounding system, means for producing an impact signal including an impact oscillator having a diaphragm, a striking element of magnetic material positioned normal to the diaphragm and means for operating the striking element including a solenoid in which the striking element moves, a lifting plunger of magnetic material mechanically operated in the solenoid aligned with the striking element, a spring positioned with reference to the striking element to be compressed by lifting the same and switching means for operating the solenoid to couple the striking element and the lifting plunger for raising the striking element.

5. In a depth sounding system, means for producing an impact signal comprising an impact striker, electrically operated power means for supplying a definite amount of mechanical work for energizing said striker, means limiting the movement of said striker, electric means for holding and releasing the striker from the electrically operated means, a switch controlled by said electrically operated means for removing the power supply and then releasing the striking means and yielding means coupling said electric means with the power means allowing the electric means to operate after the striker has reached its limiting position.

6. In a depth sounding system, in combination, means for delivering an impact vibration including an impact element, limiting means, energizing means, means for mechanically moving said element against the action of said energizing means to said limiting means for furnishing potential energy to said impact means including a line having a yielding spring therein adapted to yield as the impact element becomes energized and allow the energizing means to continue its motion, means operatively associated with said mechanical means for releasing said holding of the impact element from the mechanical means at the desired position of the mechanical means.

7. In a depth sounding system, in combination, means for delivering an impact vibration including an impact element, limiting means, energizing means, means for mechanically moving said element against the action of said energizing means to said limiting means for furnishing potential energy to said impact means including a line having a yielding spring therein adapted to yield after the impact element has come to rest, means operatively associated with said mechanical means for releasing said holding of the impact element from the mechanical means at a chosen point after the impact element has come to rest.

8. In a depth sounding system in combination with the skin of a vessel, an impact oscillator including a diaphragm having a heavy backwardly extending rim, a plate having an opening therein and extending substantially beyond the rim of said diaphragm, said opening substantially aligned with the center of the diaphragm, means holding said diaphragm to said plate, a shell positioned symmetrically with the center of said diaphragm and positioned substantially perpendicular thereto, means for holding said shell firmly to said plate and means contained within the shell adapted when operated to deliver an impact to the center of said diaphragm.

9. In a depth sounding system, an impact oscillator including a cylindrical casing having an inwardly extending flange at substantially the center thereof, a shell having a shape to fit within said casing, and positioned above said flange, a collar having a shape to fit within said casing and having a flange positioned between the lower end of the shell and the flange of the casing, said collar being formed at the lower end to engage a helical spring, said collar also providing a central opening and an impact element positioned to operate within said central opening, a helical spring mounted concentrically at one end of said collar and engaging said impact element at the other end, an upper collar positioned at the upper end of said shell, an armature adapted to be moved back and forth in said collar, a coil positioned between the upper and lower collar within said shell whereby when said coil is energized said upper armature will clutch the top of the impact element.

10. In combination in a depth sounding system, means for producing an impact signal including a motor, means periodically operating said motor in accordance with a predetermined schedule, a mechanical impact oscillator having a striking element, means positioning said element to allow a reciprocating motion thereof, means operatively connecting said motor with said striking element for energizing said striking element when it is moving in one direction, said striking element producing a signal when the element is moving in the other direction, said means including a reduction gear operated by the motor, a crank arm operated by the gear, a flexible yielding connection between the crank and the striking element for energizing the striking element, means limiting the movement of the striking element to a distance shorter than said connection and means synchronized in its relation with the position of the crank for clutching and releasing the striking element from the connecting means, said means including an indicating element rotating continuously and controlling the intermittent operation of said motor.

HOWARD WINDSOR HOLLIS.